United States Patent [19]

Kompelien

[11] 4,328,528

[45] May 4, 1982

[54] TWO-WIRE CONDITION CONTROL CIRCUIT MEANS

[75] Inventor: Arlon D. Kompelien, Richfield, Minn.

[73] Assignee: Honeywell Inc., Minneapolis, Minn.

[21] Appl. No.: 214,379

[22] Filed: Dec. 8, 1980

[51] Int. Cl.³ ............................................. H01H 47/26
[52] U.S. Cl. .................................... 361/211; 361/170; 236/68 B; 307/311
[58] Field of Search ................ 361/211, 170; 307/311; 236/68 B, 78 A; 219/505

[56] References Cited

U.S. PATENT DOCUMENTS 3,372,328  3/1968  Pinckaers .
3,974,426  8/1976  Gingras .............................. 361/211

Primary Examiner—J. D. Miller
Assistant Examiner—L. C. Schroeder
Attorney, Agent, or Firm—Alfred N. Feldman

[57] ABSTRACT

A condition control device has been shown as a thermostat that not only controls, but draws power from the same two conductors. The drawing of power from the control conductors is accomplished by momentarily opening the control circuit and allowing a charge to be stored on an energy storage means. The control of the operation of the switching relies on a voltage controlled oscillator that is synchronized to the line frequency during the slight period of time that the solid state load switch means that controls the load is deenergized.

10 Claims, 1 Drawing Figure

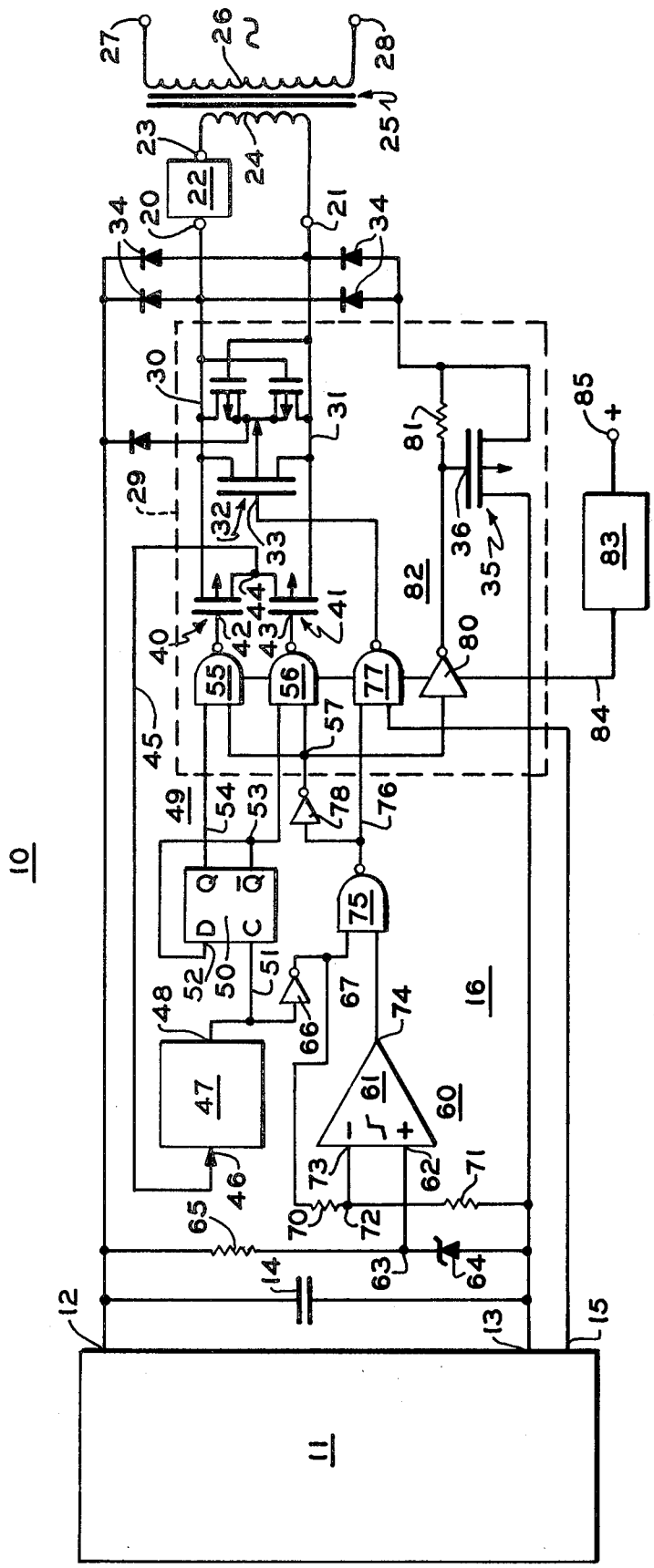

TWO-WIRE CONDITION CONTROL CIRCUIT MEANS

BACKGROUND OF THE INVENTION

Many condition control devices, and particularly thermostats, operate by opening or closing an electrical circuit having two wires connected to a load and a source of potential. The use of electromechanical types of condition responsive equipment, such as bimetal operated thermostats, easily utilized the two-wire control concept since no electric energy was drawn from the two control wires. The wires were used solely for completing an electric circuit to the load and a source of power.

In more recent years electronic types of condition control devices and thermostats have been developed. In this type of a control device or thermostat, the electronics within the device require electric power and this power has been typically supplied by a pair of additional wires to the control unit. This made the retrofitting of an electronic type of condition control device or thermostat for a mechanical thermostat a difficult, and sometimes prohibitively expensive retrofit project.

In recent years the substitution of electronically controlled thermostats for mechanically operated thermostats has accelerated because of the desirability and need for clock operated night setback and day setup functions. In certain prior art devices a battery has been placed in the thermostat to operate the electronics and the timing function, and this has led to the usual difficulties where a battery powered device is involved.

In certain prior art devices these problems have been recognized and overcome by placing a special transformer in the thermostat. The transformer was a current and voltage type of transformer. The transformer supplied power to the electronics through the voltage winding when the thermostat was not completing an electric circuit to control an external load, while supplying energy to the electronics through the current winding of the transformer when the circuit was completed to operate the external load. This added to the size and complexity, as well as the cost, of the thermostat by the addition of a very specialized type of current and voltage transformer.

SUMMARY OF THE INVENTION

It is a primary object of the present invention to provide for a condition control device or thermostat that can be connected by two wires to a load and power source to control the load. The circuitry within the control device or thermostat utilizes solid state electronics that are capable of both switching the load as required, and for drawing the necessary power from the two wires through the load to charge an energy storage means to keep the electronics in an operable condition. The electronics are so designed that the load switch that controls the power to the heating or cooling load is momentarily opened to allow power to be drawn from the line. While the concept of momentarily opening a solid state switch to draw power from a line is old, the manner in which this is accomplished is believed to be new in the present application. The opening of the solid state switch to momentarily draw power from a line typically had been accomplished in a random manner and could cause radio frequency noise generation, as well as, the possibility of drawing current through the load in such a manner as to magnetize that load. This occurs when the power is regularly drawn so that a direct current component of significant magnitude is drawn through the load and the load tends to become magnetized by this action.

The present invention overcomes this problem by opening the load switch momentarily only near the zero phase condition of the applied alternating current, and allowing that switch to remain open only for a very short time. By opening the switch at near the zero phase and for a short period of time, current is drawn to the energy storage means in such a fashion to avoid most of the problems that randomly operated equipment of this type has created. The present invention accomplishes its selective operation of the solid state switch by utilizing a voltage controlled oscillator which is synchronized with the line by sensing the current phase when the load switch is momentarily deenergized.

BRIEF DESCRIPTION OF THE DRAWING

The single FIGURE is a schematic diagram of a condition control system using two wires to control a load.

DESCRIPTION OF THE PREFERRED EMBODIMENT

A schematic diagram of a two-wire solid state control device is generally disclosed at 10. The condition control device will be generally described as a thermostat and therefore the condition for which the device controls is temperature. Any type of condition or temperature responsive circuit means 11 can be used which is powered from conductors 12 and 13 which are connected across an energy storage means or capacitor means 14. It is understood that as long as electrical power or energy is stored in the capacitor 14 equal to that which the temperature responsive circuit means 11 utilizes that energy, that the temperature responsive circuit means 11 would be functional. The temperature responsive circuit means 11 can be of any type including merely a temperature responsive resistor, bridge, and amplifiers having an output on a conductor 15 indicating the need for the energization of a load, or the lack of signal indicating the fact that the temperature responsive circuit means 11 sensed a satisfied state. The temperature responsive circuit means 11 further could contain an electronic clock to provide for night setback and day setup of temperature as is being done conventionally in battery powered and four-wire operated thermostats.

The balance of the two-wire solid state condition control device or thermostat 10 is disclosed at 16 and is the means by which power is reliably stored in the energy storage means 14, and further discloses a solid state output switch means that will be described in more detail. The control device 10 is connected by a pair of terminals 20 and 21 to a load means 22 and a further terminal 23 along with a step down winding 24 of a transformer generally disclosed at 25. The transformer 25 has a primary 26 winding that is connected at a pair of terminals 27 and 28 to any conventional source of alternating current, such as a 115 volt 60 hertz supply. The load means 22 can be a conventional gas valve for a gas fired furnace, a relay to operate electrical air conditioning equipment, or any similar type of electromechanically operated load. The only requirement of the load means 22 is that it be a typically operated alternating current load and that it has a relatively slow response to operation as compared to an electronic type of switch. The reason for this requirement will be brought out when the operation of the solid state condition control device 10 is explained.

The terminals 20 and 21 provide for connection to two wires 30 and 31 that connect the thermostat 10 through the load means 22 and the source of alternating current as provided by the secondary winding 24. It is essential to the operation of the present device that all of the energy for the operation of the electronics within the thermostat 10 be drawn from the conductors 30 and 31 even when the load 22 is energized by the conductors 30 and 31 being normally shorted together by a solid state switch means that will be described. A solid state switch means is generally disclosed at 32 and the solid state switch means is a form of a field effect transistor that is capable of completing a circuit between the conductors 30 and 31 under the control of a gate 33. Associated with the field effect transistor 32 are some auxiliary or internal field effect transistors that are used with this type of a device in an integrated form. The bounds of an integrated circuit is generally disclosed by the dotted lines 29. The solid state switch means or field effect transistor 32 operates to either open or short circuit a path between the conductors 30 and 31. The manner of structuring and operating a field effect transistor or solid state switch means 32 is known in the art and one example of such a device can be found in the co-pending application Ser. No. 53,870 filed on July 2, 1979 by Arlon D. Kompelien and assigned to assignee of the present invention. In reality, the only thing that is necessary is that the solid state switch means 32 is capable of responding to its gate means 33 to open and short circuit the conductors 30 and 31 for bipolar current with the speed of a conventional solid state switch and forming a very low impedance drop across the conductors.

Connected across the conductors 30 and 31 are four diodes 34 that form a full wave bridge. The full wave bridge derives power from the conductors 30 and 31 and is connected by conductor 12 to the energy storage means or capacitor 14 through a charging switch means 35. The charging switch means 35 has been disclosed as a further field effect transistor means that is part of the integrated circuit means 29. The field effect transistor means 35 has a gate 36 that causes the field effect transistor means 35 to be switched between a conductive and nonconductive state. It is obvious that when the field effect transistor 35 is in a conductive state and power is supplied on the conductors 30 and 31 with the main load switch 32 in the "off" state, that the diodes 34 supply a direct current potential to the capacitor 14 to store energy in the capacitor 14 so that it can act as an energy storage means for both the temperature responsive circuit means 11 and the balance of the thermostat 10 as exemplified by the electronics 16.

The pair of conductors 30 and 31 are further connected to a pair of field effect transistors generally disclosed at 40 and 41. These field effect transistors have gates 42 and 43 that cause the field effect transistors 40 and 41 to switch between conductive and nonconductive states. The field effect transistors 40 and 41 are connected each to opposite sides of the load switch 32 with a common connection 44 between them. This common connection is brought out on a conductor 45 to an input means 46 for a voltage controlled oscillator means generally disclosed at 47. The voltage controlled oscillator means 47 has an output at 48. The voltage controlled oscillator means 47 is selected to have a normal oscillating frequency that is nominally a multiple of the frequency of the alternating current voltage applied between the terminals 27 and 28 to the system. In the example disclosed in the present circuit, the voltage controlled oscillator means 47 would have a frequency of oscillation nominally at 120 hertz. A voltage at the input means 46 can cause the voltage controlled oscillator to either increase or decrease its frequency of oscillation. Whether the voltage is negative or positive with respect to a reference voltage depends on whether the field effect transistor 40 or the field effect transistor 41 is conductive. In the present arrangement the field effect transistors 40 and 41 are driven differentially from a flip-flop 50 so that only one can be conductive at a time. It is quite obvious that if the field effect transistor 40 is conductive, the point 44 is effectively connected to the conductor 30. If the field effect transistor 41 is conductive, the point 44 is effectively connected to the conductor 31. By selectively driving the field effect transistors 40 and 41 either a positive or negative potential can be applied from the junction 44 to the input means 46 of the voltage controlled oscillator 47 thereby adjusting its frequency and phase of oscillation as is required to keep it in proper synchronization with the applied frequency to the transformer 25.

The voltage controlled oscillator means 47 is designed having an input resistance and capacitive type of filter to average the voltage that is applied to it. In the particular embodiment disclosed, a decrease in frequency occurs when the input voltage to the voltage controlled oscillator means 47 is negative with respect to the general reference voltage for the circuit. The reverse is true, that is the frequency increases with a positive voltage. As has been pointed out, the type of voltage, that is whether it is negative or positive, is determined by which of the field effect transistors 40 and 41 is conductive.

The output means 48 of the voltage controlled oscillator means 47 is connected to a clocked flip-flop of conventional design shown at 50 which acts as an input to a logic switching means 49. The output voltage from the output means 48 is connected by conductor 51 to the clock input of the flip-flop. The flip-flop 50 is connected so that the D input at 52 is connected to the Q output 53. With this arrangement the Q output 53 is at a frequency of 60 hertz as the flip-flop 50 acts as a frequency divider and divides the output frequency of the voltage controlled oscillator means 47 in half. Obviously if the output at the point 53 or the Q output is high, the Q output on a conductor 54 is low. The output alternates between high and low so that a pair of NAND gates 55 and 56 can be driven in a differential fashion. The NAND gates 55 and 56 each are connected to one of the gates 42 and 43 of the field effect transistors 40 and 41. The NAND gates 55 and 56 can be integrated as part of the integrated circuit means 29 as noted. It can be seen that if the NAND gate 55 is driven from the Q output of the flip-flop 50, and the NAND gate 56 is driven by the Q output of the C-D flip-flop 50, that the gates 42 and 43 of the field effect transistors 40 and 41 are differentially operated thereby providing for the possibility of one of them to be conductive at a time. The NAND gates 55 and 56 further have a common connection to a point 57 to complete the necessary logic for the NAND gates to provide for the possibility of either transistor 40 or 41 to be conductive.

A comparator means is generally provided at 60 and includes a threshold detector 61 that is connected at its non-inverting input 62 to a point 63 between a zener diode 64 and a resistor 65 that are connected in series. The resistor 65 and the zener 64 are in turn connected in parallel with the energy storage means 14. A reference voltage is therefore generated at point 63 so that the non-inverting terminal 62 of the threshold detector 61 of the comparator means 60 operates at this reference voltage. The output means 48 of the voltage controlled oscillator is connected to the comparator means 60 through a NOT gate 66 and a conductor 67 which is connected to a voltage divider made up of resistors 70 and 71 that have a common connection 72 connected to the inverting terminal 73 of the threshold detector 61. The threshold detector 61 has an output means 74 which acts as the output means for the comparator means 60. The comparator means 60 compares the voltage across the energy storage means 14 through its effect on the voltage of conductor 67 with the zener reference at point 63. The voltage on conductor 67 is also dependent upon the output 48 of the voltage controlled oscillator 47. When the phase of voltage controlled oscillator 47 is such that the voltage of conductor 67 is driven low, the voltage at point 72 (input 73 of the comparator) is lower than the zener 64 voltage at point 63 (input 62 of the comparator). During this state of oscillator 47, the output of comparator means 60 at point 74 is driven high. With the input to a NAND gate 75 from conductor 67 being low, its output is high. Under this condition, through logic means to be described, the solid state switch means 32 is under control of the temperature responsive circuit means 11 and the charging switch means 35 is "off", and no charging of capacitor 14 is taking place. During this time the loading on capacitor 14 is reducing its voltage slightly. Now when the voltage controlled oscillator output 48 changes state such that the voltage on conductor 67 is driven high, both logic inputs to NAND gate 75 are high. This takes over control of the solid state switch means 32 to turn it "off" (if it was normally "on", energizing load 22) and turns the charging switch means 35 "on". Also during this charging time either transistor 40 or 41 is conductive to feed a signal voltage to the voltage controlled oscillator 47. At the instant when the voltage on conductor 48 went high, the voltage at input 73 of comparator means 60 did not exceed that at 62 since capacitor 14 had discharged slightly from a previous charging period. The comparator output 74 then stays high until the charging on capacitor 14 raises the voltage on conductor 67 to a value that causes comparator input 73 to exceed the zener input 62. At this point the comparator output 74 goes low effecting its input to NAND gate 75 to stop charging capacitor 14 through transistor switch means 35 and turning control of the solid state switch means 32 over to the temperature responsive circuit means 11. Due to the low power requirements of circuit means 11, the charging time is very short relative to a 60 hertz period and has negligible effect on the control of the alternating current load 22. The signal voltage from the transistor 40 or 41, during the charging period to the voltage controlled oscillator 47, maintains the oscillator phase to cause charging action to occur near the zero crossing of the applied alternating current to the alternating current load 22.

The output of the voltage controlled oscillator means 48 is also supplied through the NOT gate 66 to the NAND gate 75 that is connected to the output means 74 of the comparator means 60 and to the NOT gate 66. As stated above, the NAND gate 75 senses the proper time to activate the field effect transistors 32 and 35 to charge the capacitor 14 with this state being related to the zero crossings of the applied alternating current voltage to the transformer 25. The NAND gate 75 is connected through a NOT gate 78 to the junction 57 of the NAND gates 55 and 56 thereby providing them with the appropriate digital logic to control the time of switching of the field effect transistors 40 and 41 to feed back the appropriate synchronizing voltage to the voltage controlled oscillator 47. The output of the NAND gate 75 also is supplied on a conductor 76 to a further NAND gate 77 that has its output connected to control the gate 33 of the field effect transistor 32. The NAND gate 77 is connected for its further logic to the conductor 15 so that the NAND gate 77 is functional to control the field effect transistor 32 not only for momentarily opening the circuit between 30 and 31 to allow the charging of the capacitor 14, but for the basic control of the field effect transistor 32 to control the power being drawn through the load means 22.

The system is completed by providing a NOT gate 80 whose output is connected to the gate 36 of the field effect transistor 35 through a resistor 81 to the diodes 34. The resistor 81 acts as a system start up signal for the field effect transistor 35 prior to the point where the voltage on capacitor 14 has reached a controlling level. With the components that have been shown in integrated form, the device is generally referred to as a P channel device and the application of a logic 0 or a low voltage causes the field effect transistors to be conductive. A high digital logic or voltage such as a digital 1 causes the field effect transistors to be nonconductive. The NAND gate 75, the NAND gate 77, and the NOT gate 80 generally form a charging logic means disclosed as 82. This charging logic means 82 is used to control the operation of the field effect transistor 32 and the field effect transistor 35. It turns transistor 32 "off" and transistor 35 "on" momentarily when the load 22 is energized, but that moment is controlled at or near a zero phase condition so that the charging of capacitor 14 occurs with a minimum generation of radio frequency interference and disturbance to power on load 22. Operation is symmetrical relative to the positive and negative half cycles of alternating current power so no direct current component is created in load means 22.

The system is completed by a voltage converter means 83 that is shown connected at 84 to the logic elements 55, 56, 77, and 80. The voltage converter means 83 has an input terminal 85 that is driven from the conductor 12. The reason for this is that the logic elements typically are operated more effectively at a higher voltage than is available on conductor 12 in order to effectively drive the gates of the integrated field effect transistors 32 and 35. The need for this higher voltage is strictly a function of the technical parameters of the integrated circuit 29.

The operation of the disclosed circuit can best be understood by considering the circuit as powered up and operating with the energy storage means 14 having a normal charge to supply power to the temperature responsive circuit means 11. If it is assumed that the temperature responsive circuit means 11 has an output on conductor 15 which causes the charging logic means 82 (through the NAND gate 77) to drive gate 33 which in turn causes field effect transistor 32 to be conductive, it will be understood the load means 22 is energized. With the field effect transistor 32 conductive there is a very low resistance path between the conductors 30 and 31 thereby allowing energy to flow through the field effect transistor 32, the terminal 21, the transformer secondary 24, to the load means 22. If this condition were allowed to exist for a long period of time, the energy storage means 14 would be depleted of charge and the system would not continue to function properly. In order to insure that the system functions properly, the field effect transistor 32 must be regularly driven out of conduction for a very short period of time. The short period of time that the field effect transistor 32 is not conducting the diode bridge made up of diodes 34 supplies energy to the energy storage means 14. During this very short period of time the field effect transistor 35 is driven into conduction allowing the charge to be stored on the energy storage means 14. The period of time selected, since the switching means is electronic, can be far shorter than the response period for the load means 22. For all practical purposes, the momentary opening and closing of the field effect transistor 32 does not allow the load means 22 to become deenergized. Load current can continue to flow through load means 22, but with a higher voltage drop inserted by the control circuit to charge capacitor 14 during the open time of load means 32. If the load means 22 is a relay or a valve, the electromagnetic device and its inertia is so slow that it does not respond to the momentary opening of the field effect transistor 32 and the slight loss in power due to charging of the energy storage means 14 by conduction through the field effect transistor 35. This occurs near zero crossing of each half cycle of the applied alternating current voltage with the voltage controlled oscillator means 47 operating at a 120 hertz, and with the C-D flip-flop outputs 53 and 54 and the balance of the system operating at 60 hertz.

In order to keep the frequency of the voltage controlled oscillator 47 synchronized to the line frequency, the voltage controlled oscillator means input 46 is connected at 44 through either the field effect transistor 40 or 41 to the conductors 30 or 31 thereby sensing the voltage on the conductors 30 and 31. The voltage fed back on the conductor 45 from the junction 44 each time the field effect transistor 32 is turned "off" is to the input means 46 of the voltage controlled oscillator 47 to maintain its phase angle relative to the cross over point of the alternating current. When transistor 32 is turned "off" each half cycle near the cross over current point, the frequency of the oscillator means 47 is at 120 hertz and its output allows the logic switching means 49 and the charging logic means 82 along with a comparator means 60 to momentarily charge energy storage means 14 from the load current of load 22 through the diodes 34. Any drift of frequency of the voltage controlled oscillator means 47 to shift its phase from this zero crossing current condition allows a sufficient voltage to be fed back on the conductor 45 to momentarily readjust the frequency of the voltage controlled oscillator means 47 to bring it back into proper phase relationship.

If the field effect transistor 32 is not being driven into conduction because the temperature responsive circuit means 11 indicates that the load means 22 does not have to be energized, the system through the charging logic means 82 and the NOT gate 80 drives the field effect transistor 35 into conduction without causing any change in the state of the field effect transistor 32. This allows for regular, momentary charging of the capacitor or energy storage means 14 at or near the cross over point of the alternating current voltage thereby maintaining the ability of the system to charge the energy storage means 14 without generating any significant radio frequency interference nor providing the load means 22 with a direct current magnetizing current that would create a residual magnetic condition.

In the present invention the known concept of momentarily opening a power switch to a load by electronic means for storage of energy has been improved on by synchronizing the operation of a solid state switch with the line voltage in such a manner as to insure that a minimum of radio frequency interference is created and that little or no direct current magnetizing current is drawn in the load means to upset the magnetic circuit of a conventional relay or valve. The logic disclosed for this operation has been disclosed as a voltage controlled oscillator operating at twice the line frequency with a clocked D flip-flop dividing by two to equal the line frequency. Also specific digital logic has been disclosed which would accomplish the digital synchronization of the various circuit elements. It is quite obvious that the concept could be implemented with different frequencies and different digital logics. Since almost any digital logic can be implemented in numerous ways, the applicant wishes to be limited in the scope of his invention solely by the scope of the appended claims.

The embodiments of the invention in which an exclusive property or right is claimed are defined as follows:

1. A two-wire solid state condition control device adapted to be connected to an alternating current voltage source through a load wherein the electric power to energize said condition control device is periodically drawn through said load, including: series charging circuit means having a pair of terminals and including rectifier means and charging switch means connected in series circuit with energy storage means to said pair of terminals which are adapted to be connected to said load and said alternating current potential source; solid state switch means connected across said terminals to controllably energize said load from said voltage source; voltage controlled oscillator means including output means having an output voltage at a frequency which is nominally a multiple of the frequency of the alternating current potential source; said voltage controlled oscillator means having an input which alters the voltage controlled oscillator means output frequency above and below said nominal frequency of said oscillator means; logic switching means having an input connected to said voltage controlled oscillator output means, and having switchable output means connected across said solid state switch means and to said voltage controlled oscillator input means to control said voltage controlled oscillator means; comparator means connected to compare a voltage across said energy storage means and the voltage controlled oscillator means output voltage; said comparator means having output means with said comparator output means changing state upon the voltage across said energy storage means reaching a predetermined value; charging logic means having input means connected to said voltage controlled oscillator output means and said comparator output means; and said charging logic means having output means connected to control said series charging switch means and said solid state load switch means; said charging logic output means controlling said solid state switch means and said series charging switch means to periodically supply energy to said energy storage means from said terminals by causing said solid state switch means to become nonconductive in response to the voltage controlled oscillator output means at approximately the time at which said alternating current voltage passes through its zero voltage phase, and simultaneously causing said series charging switch means to become conductive.

2. A two-wire solid state condition control device as described in claim 1 wherein said condition control device is a thermostat, and said load includes an electromagnetic control means.

3. A two-wire solid state condition control device as described in claim 2 wherein said rectifier means includes four diodes connected in a full wave bridge, and said energy storage means is a capacitor.

4. A two-wire solid state condition control device as described in claim 3 wherein said voltage controlled oscillator means has a nominal frequency of twice the frequency of said alternating current voltage source, and said logic switching means includes flip-flop means to divide said nominal frequency in half.

5. A two-wire solid state condition control device as described in claim 4 wherein said charging switch means and said solid state switch means each includes a field effect transistor as an output switch means.

6. A two-wire solid state condition control device as described in claim 5 wherein said comparator means having voltage divider means which includes a zener diode connected in parallel with said capacitor to provide said comparator means a first comparator input voltage, said zener diode providing a reference voltage for said comparator means.

7. A two-wire solid state condition control device as described in claim 6 wherein said switchable output means of said logic switching means includes a similar pair of field effect transistors connected in series circuit with a common connection between said similar pair of field effect transistors; said common connection connected to said voltage controlled oscillator input means to provide a voltage to said voltage controlled oscillator means to adjust the frequency of said oscillator means.

8. A two-wire solid state condition control device as described in claim 7 wherein said field effect transistor of said charging switch means, said field effect transistor of said solid state switch means, and said similar pair of field effect transistors of said logic switching means output are part of a single integrated circuit.

9. A two-wire solid state condition control device as described in claim 7 wherein said charging logic input means further includes connection means to temperature responsive circuit means to control said solid state switch means to in turn control said load in response to said temperature responsive circuit means.

10. A two-wire solid state condition control device as described in claim 8 wherein said single integrated circuit is connected to voltage converter means with said voltage converter means having an elevated output voltage for operation of said field effect transistors; and said voltage converter means having an input connected to said energy storage means to power said converter means.

* * * * *